Figure 4:
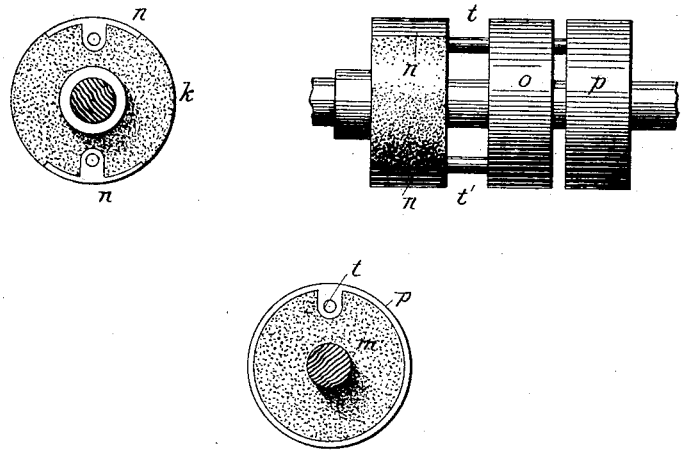

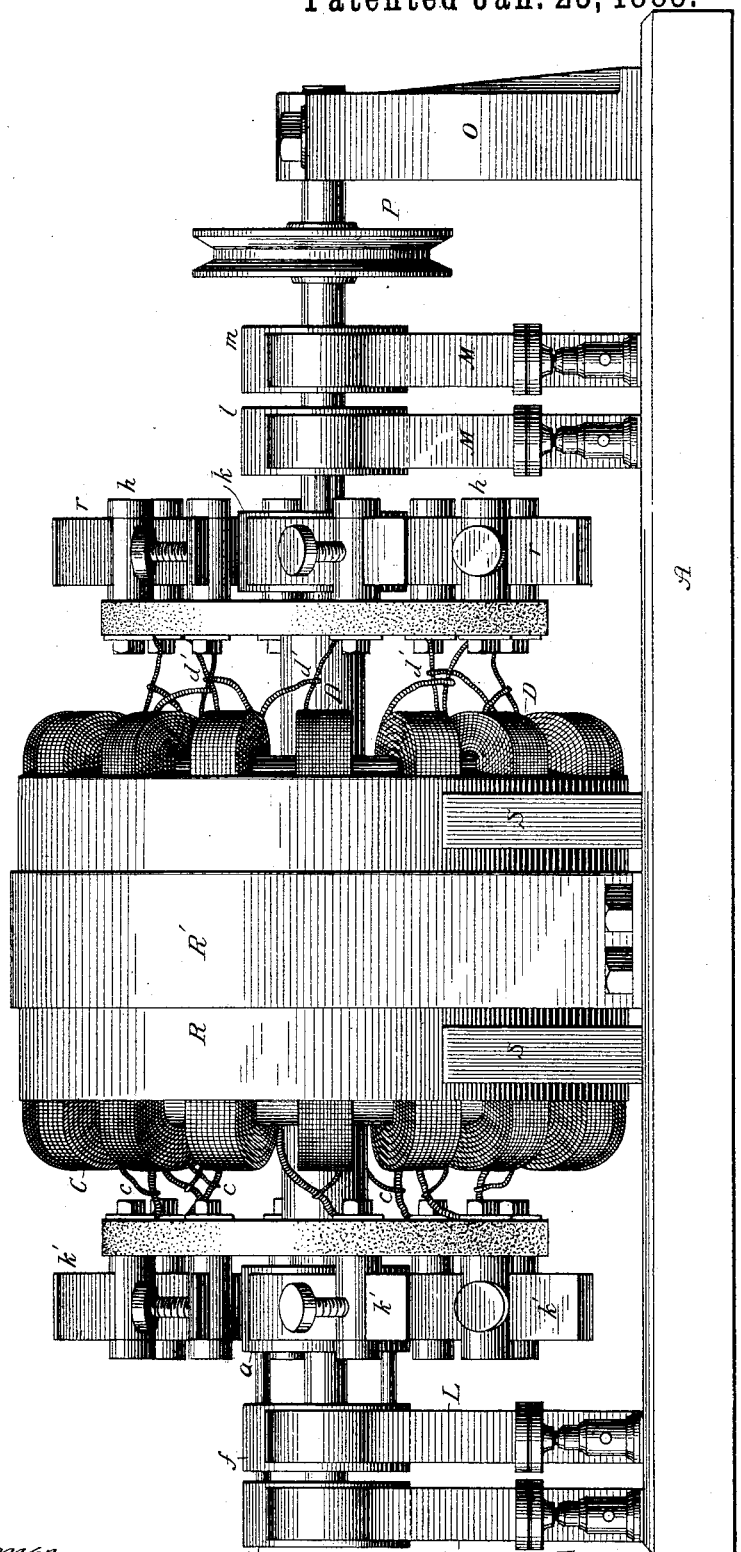

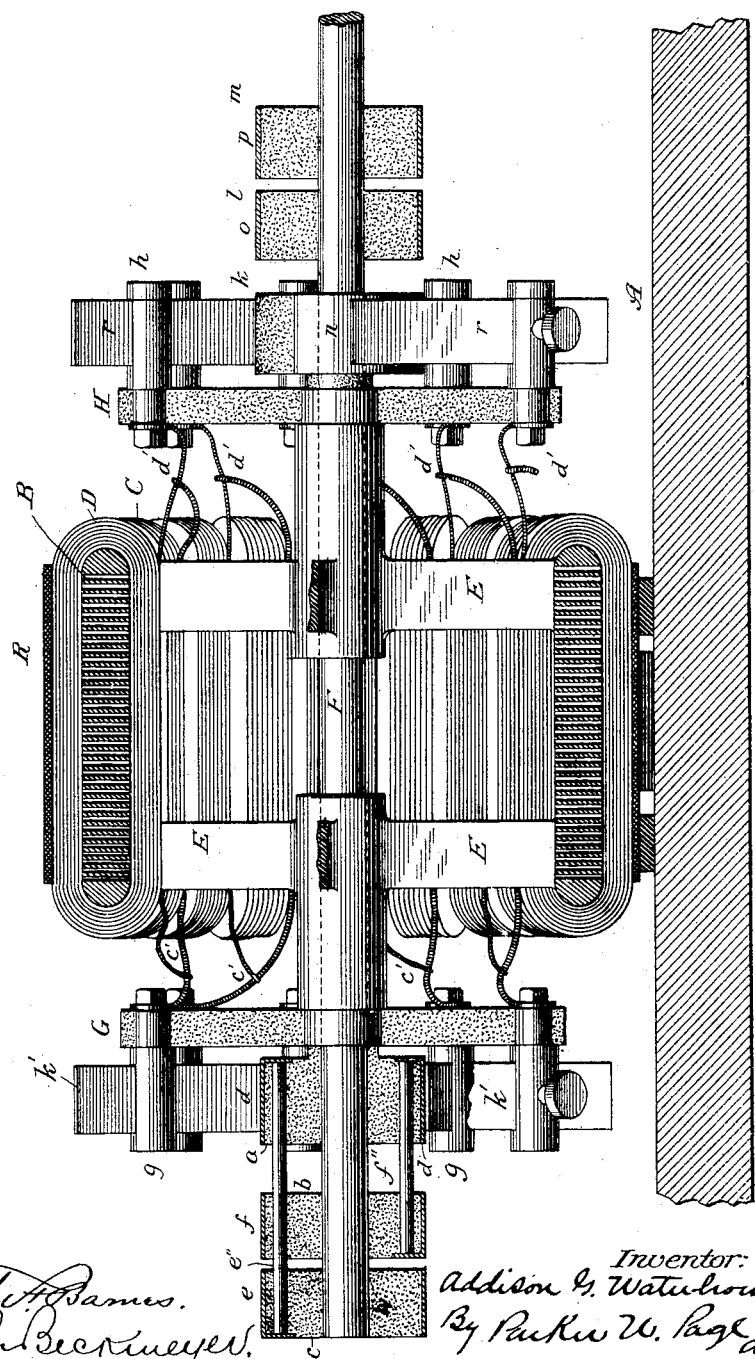

(No Model.) 5 Sheets—Sheet 3.
A. G. WATERHOUSE.
ELECTRIC INDUCTION MACHINE.
No. 271,169. Patented Jan. 23, 1883.

Attest:
Raymond F. Barnes.
Henry A. Beckmeyer

Inventor:
Addison G. Waterhouse
By Parker W. Page.
Atty.

(No Model.)  
A. G. WATERHOUSE.  
ELECTRIC INDUCTION MACHINE.
No. 271,169. Patented Jan. 23, 1883.
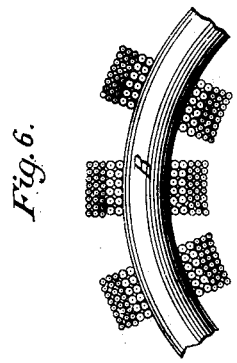
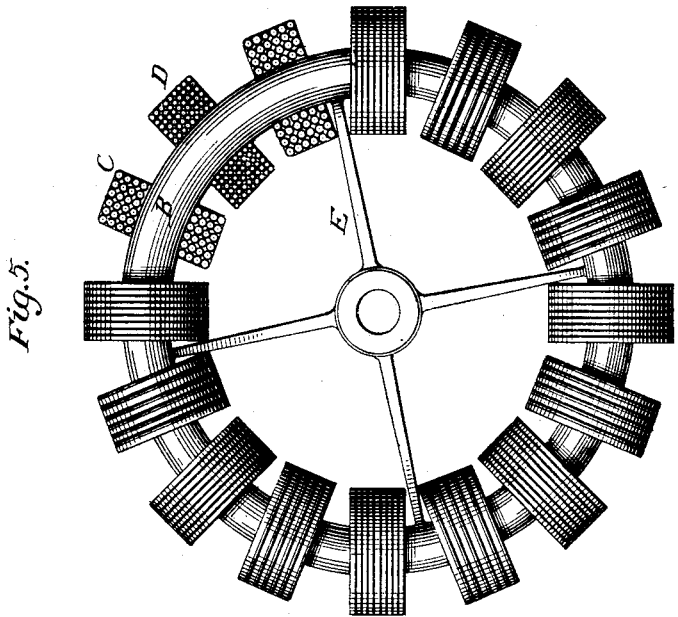

(No Model.)

A. G. WATERHOUSE.
ELECTRIC INDUCTION MACHINE.

No. 271,169. Patented Jan. 23, 1883.

Attest:
Raymond F. Barnes.
Henry A. Beckmeyer.

Inventor:
Addison G. Waterhouse
By Parker W. Page
Atty.

UNITED STATES PATENT OFFICE.

ADDISON G. WATERHOUSE, OF NEW YORK, N. Y.

ELECTRIC-INDUCTION MACHINE.

SPECIFICATION forming part of Letters Patent No. 271,169, dated January 23, 1883.

Application filed October 24, 1882. (No model.)

*To all whom it may concern:*

Be it known that I, ADDISON G. WATERHOUSE, a citizen of the United States, and a resident of New York, in the county and State of New York, have invented certain new and useful Improvements in Electrical Machines, of which the following is a specification, reference being had to the drawings accompanying and forming a part of the same.

My invention is based on the principle of magnectic induction as exemplified in the following case: A well-known type of magneto-electric generator contains poles of opposite polarity, constituting the field, and an iron ring wound with an arbitrary number of bobbins, and constituting the armature. The former are stationary. If, then, the latter be rotated or moved so that the coils are brought successively under the influence of opposite poles, electrical impulses will be generated in the armature-coils. Though the iron ring is revolved, the points of maximum magnetic intensity remain fixed with respect to the field, so that they are, so to speak, continually traveling around the ring. If the ring be held stationary and the field-magnets revolved, the same effects are produced; or if the ring and field both be moved and the coils held stationary the same results follow. In all cases there is what may be called a "movement" in the same direction of the most highly-magnetized portions of the armature with respect to the coils. My object is to effect this movement without rotating either armature or field, and this I accomplish in the following manner: On an iron ring or band I wind any desired number of coils similarly to the plan followed in the construction of the well-known Gramme armature. These coils are then connected up in two continuous series, alternate coils being looped together on opposite sides of the ring. The two series of loops are then connected, in a manner hereinafter specified, to commutating devices, one of which introduces a current to one series of coils in such manner as to magnetize all portions of the ring successively, while the other takes off the currents that are developed in the second series of coils by the movement of the magnetic poles. The specific means which I have devised for carrying out this invention are illustrated in the accompanying drawings, where—

Figure 3:
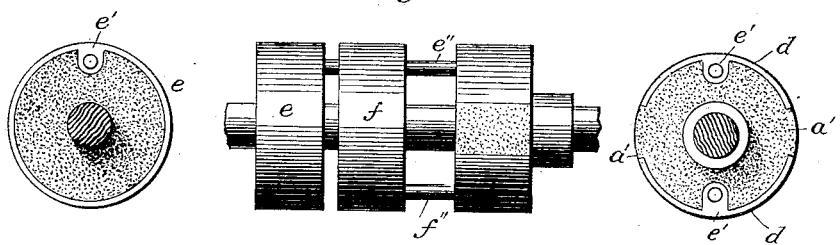
Figure 8:
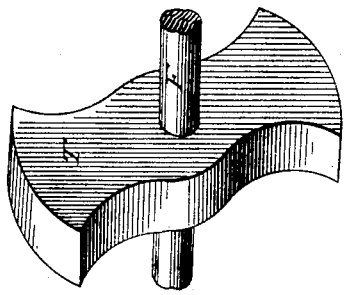
Figure 7:
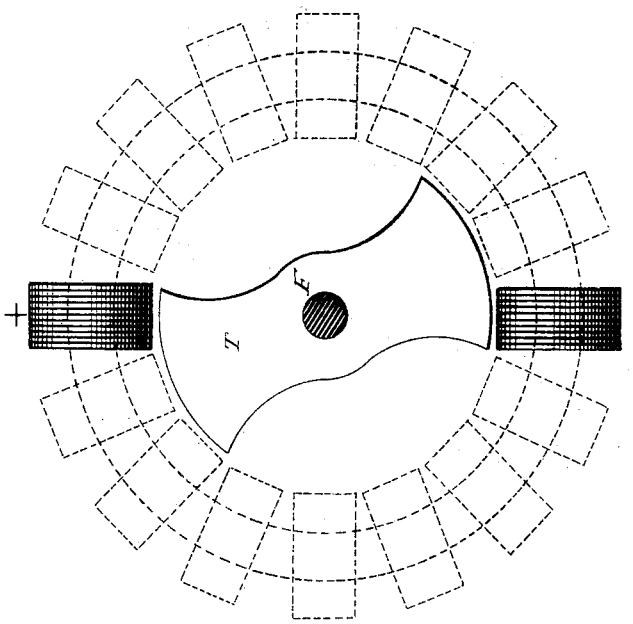

Figure 1 illustrates in side elevation the apparatus complete. Fig. 2 is a central longitudinal section of the same, with parts shown in elevation. Fig. 3 illustrates in elevation and by end views the commutating devices, by means of which the current is introduced to one series of coils. Fig. 4 is a similar illustration of the devices for taking off the current. Fig. 5 shows in elevation and part section a modification of the ring and coils. Fig. 6 is a sectional view of a portion of another modification of the ring. Fig. 7 is an end view of a device for imparting motion to the commutator-shaft, and Fig. 8 a perspective view of the same.

Similar letters of reference indicate corresponding parts in all the figures.

A is the base upon which the apparatus is mounted; B, a ring or cylinder of iron, iron and insulating material, or iron plates with air-spaces, similar in construction to the ordinary Gramme ring.

C is an arbitrary number of coils wound upon the ring in the manner shown; and D an equal number of coils wound in the spaces between them.

R is a band, of metal or other material, surrounding the coils, and R' a strap binding the whole tightly in a seat formed by the curved blocks S S.

E E are metal spiders within the ring B, through the hubs of which passes a spindle, F.

G H are two plates, of insulating material, fixed to the hubs of the two spiders E E, respectively, and in said plates are set binding-posts $g$ $h$, corresponding in number and position to loops $c'$ $d'$, that are formed by connecting the ends of the two series of coils C D.

Fixed to the spindle F, beyond the plate G, is a commutating device consisting of three disks of insulating material, $a$ $b$ $c$. In the surface of disk $a$ are set two metal plates, $d$ $d$, that leave the diametrically-opposite spaces $a'$. Disks $b$ $c$ are surrounded by complete rings $e$ $f$, of metal, and rods $e''$ $f''$, passing through the disks and riveted to ears $e'$ $e'$ on the several rings and plates, connect electrically the ring $e$ with one of the plates $d$ and the ring $f$ with the other.

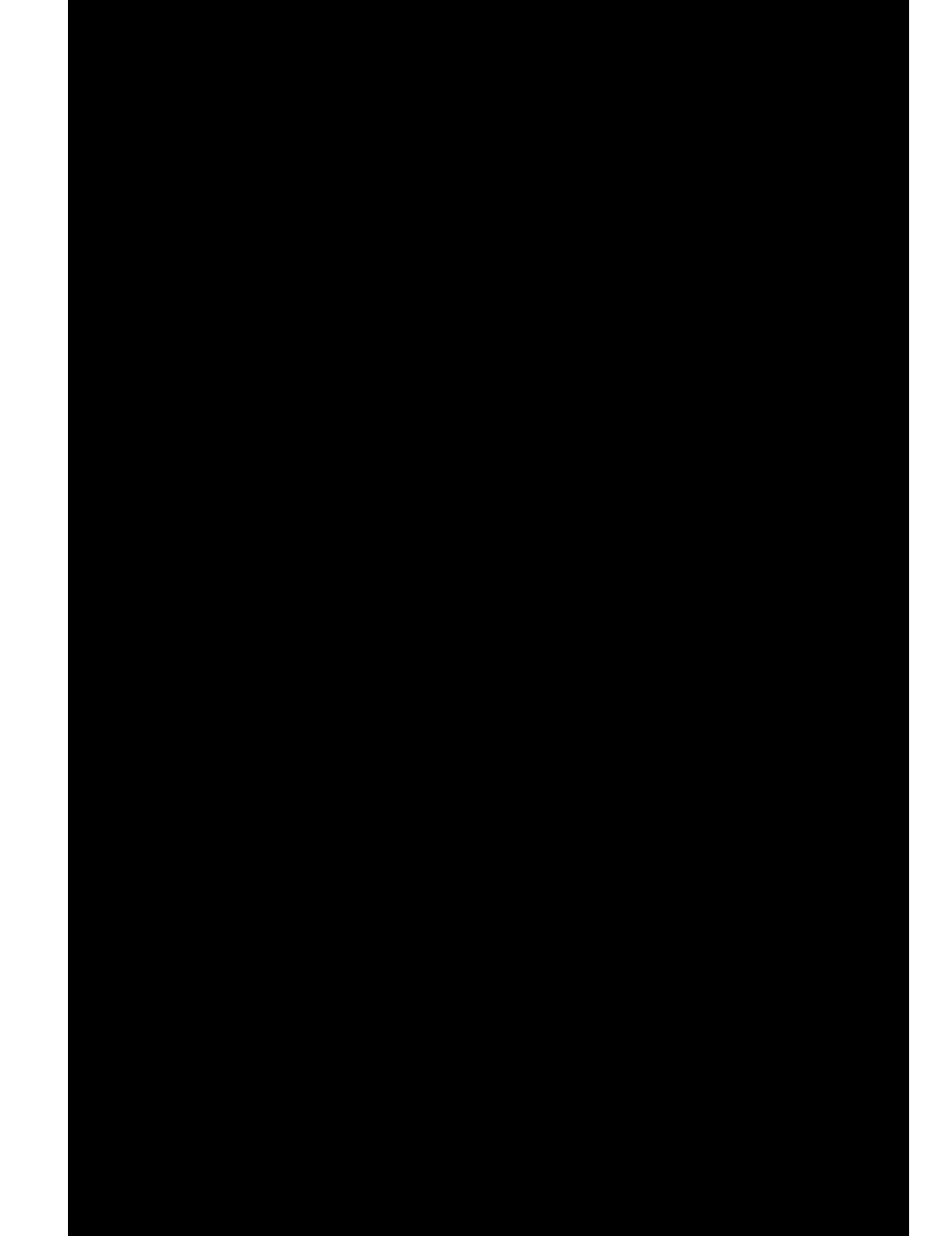

thereon, two sets of insulated brushes connected with the coils, a revolving commutator in contact with one set of brushes, whereby a current may be passed through the same in opposite directions successively, and a collector in contact with the second set of brushes for taking off the currents induced in the system of coils with which they are connected, as set forth.

4. In an apparatus of the kind described, the combination, with the stationary core, the two systems of coils, and brushes connected therewith, of a revolving shaft, a commutator, a collector, and an armature carried thereby, these parts being constructed and combined in substantially the manner herein set forth.

5. The combination of core B, the systems of coils C D, and the brushes $k'$ $r'$, connected to the coils in the manner described, the disks $a$ $k$, plates $d$ $n$, and means for maintaining the latter in electrical contact with opposite circuit-terminals, as and for the purpose set forth.

6. The commutating and collecting devices consisting in the combination of three disks, one carrying two insulated plates, the others continuous rings connected respectively with the insulated plates in substantially the manner described.

In testimony whereof I have hereunto set my hand this 20th day of October, 1882.

ADDISON G. WATERHOUSE.

Witnesses:
HENRY A. BECKMEYER,
PARKER W. PAGE.